United States Patent [19]

Lipp

[11] Patent Number: 5,306,457
[45] Date of Patent: Apr. 26, 1994

[54] EXTRUSION DIE AND METHOD
[75] Inventor: G. Daniel Lipp, Painted Post, N.Y.
[73] Assignee: Corning Incorporated, Corning, N.Y.
[21] Appl. No.: 69,085
[22] Filed: May 28, 1993
[51] Int. Cl.[5] ............................................. B29C 47/12
[52] U.S. Cl. ..................... 264/177.12; 264/211.11; 419/67; 425/461; 425/462
[58] Field of Search ............ 264/177.12, 211.11; 425/461, 462, 463, 464, 466, 467; 419/67

[56] References Cited

U.S. PATENT DOCUMENTS

| 1,874,503 | 8/1932 | Greenwood | 425/463 |
| 3,983,283 | 9/1976 | Bagley | 428/116 |
| 4,127,691 | 11/1978 | Frost | 428/116 |
| 4,741,792 | 5/1988 | Matsuhisa et al. | 156/89 |
| 4,767,309 | 8/1988 | Mizuno et al. | 425/461 |
| 4,902,216 | 2/1990 | Cunningham et al. | 426/463 |
| 4,955,524 | 9/1990 | Way | 228/182 |

FOREIGN PATENT DOCUMENTS 50-29922 9/1975 Japan.

Primary Examiner—Jan H. Silbaugh
Assistant Examiner—Christopher A. Fiorilla
Attorney, Agent, or Firm—K. van der Steere

[57] ABSTRACT

A method and die apparatus for manufacturing a honeycomb body of rhombic cell cross-section by extrusion through an extrusion die of triangular cell discharge slot configuration, the die incorporating feedholes at selected slot intersections only, such that slot segments communicating directly with the feedholes discharge web material and slot segments not so connected do not discharge web material, whereby a rhombic cell cross-section in the extruded body is provided.

10 Claims, 2 Drawing Sheets

EXTRUSION DIE AND METHOD

The Government of the United States of America has rights in this invention pursuant to Contract No. DEN3-336 awarded by the Department of Energy.

BACKGROUND OF THE INVENTION

The present invention relates to an extrusion die for forming thin-walled honeycomb structures from extrudable materials such as glasses, glass-ceramics, ceramics, plastics, metals, cermets and other materials. In the ceramic arts, such dies are used for the extrusion of ceramics dispersed as powders in shapeable (plastic) extrusion batches to provide extruded green bodies of complex honeycomb shape.

Thin-walled ceramic honeycomb structures with multiple parallel through-channels or cells display utility in a variety of applications. For example, such structures exhibit utility as catalytic converters in the exhaust system of internal combustion engines. They also exhibit more general utility as catalyst carriers, filter bodies, and thermal regenerators or heat exchangers.

Dies used for the extrusion of ceramic honeycombs commonly have shallow, criss-crossing and interconnecting slots on the downstream or exiting die face from which the ceramic batch emerges and which during emergence form the webs or sidewalls of the cells of the honeycomb structure being made. To supply the batch material to these slots, feed holes are provided in the opposite or upstream die face which connect with and feed batch material to the slots.

In common production dies the feed holes are aligned with the intersections of the slots on the outlet face of the die. This is because the intersections generally require larger proportions of the batch material for proper slot filling and web formation in the extruded shape. Some dies have a feed hole at every intersection, while other dies have holes at alternate intersections. Alternating hole patterns using fewer holes of larger diameter can be advantageous in that the dies are easier and less costly to produce, and are more resistant to bending deformation under high extrusion pressure.

Dies are also occasionally made with the feed holes aligned with the central portions of the slot segments, eg., midway between the slot intersections. This feedhole positioning can improve the strength of the "pins", which are the projecting islands of metal bounded by the slots on the exit face of the die defining the channels in the honeycomb material extruded from the die.

A variety of die configurations for extruding honeycomb bodies of both triangular and square cell cross-section are known. U.S. Pat. No. 1,874,503, for example, discloses a triangular cell extrusion die wherein the feed holes supply batch material to the intersections of the triangular slots, this die being used for the extrusion of candy. Unexamined Japanese Patent Publication No. 50-29922 describes extrusion dies for the continuous manufacture of ceramic honeycombs having channels or cells of triangular cross-section which comprise feed holes supplying either the slot intersections or the central portions of the slots.

Dies of alternating feed hole design are also known. U.S. Pat. No. 4,741,792, for example, discloses a rectangular cell die configuration for extruding honeycomb ceramic heat exchanger bodies wherein the feed holes are positioned at alternating slot intersections In this design, only two of the four corners of each extruded cell are formed by the direct flow of batch material thereto. The other corners of each cell are formed by lateral flow of the extrudable batch material within the slots to achieve the necessary web knitting at such other corners.

More complex arrangements of holes and slots are shown in U.S. Pat. No. 4,902,216, which describes dies comprising both primary and secondary discharge slots. In dies of this design, the secondary slots, which typically differ in depth from the primary slots, are supplied with extrudable material by the primary slots, rather than by feedholes communicating directly with the secondary slots.

One problem associated with the production of extruded bodies from dies of the types shown in these patents relates to the thermal shock resistance of the bodies in applications involving use at high temperatures. Thus extruded honeycomb products composed of fired ceramics, or even of sintered metals, are subject to severe thermal stress in the course of heating and cooling from high temperatures. This is particularly true where, as is frequently the case, the heating and cooling is not uniform across the body.

Thermal shock problems in these honeycomb bodies are aggravated by the fact conventional dies and honeycombs produced therefrom feature arrays of square, rectangular or triangular cells based on long straight webs traversing the entire cross-section of the bodies. Honeycomb product configurations based on such straight continuous webs can be efficiently made since dies with long straight slots are economical to fabricate. Unfortunately, however, such cell arrays do not exhibit optimum thermal shock resistance, due in part to the limited flexibility of long straight webs which cannot readily relieve stress by bending.

In principle, honeycomb bodies having cell configurations wherein long webs are absent would offer advantages in thermal shock performance. Examples of such cross-sections, which could exhibit greater flexibility than conventionally packed triangular, square, or rectangular cells, include hexagonal, rhombic, and staggered rectangle cell cross-sections. Attempts to make such structures have included specialized die modification techniques such as disclosed in U.S. Pat. No. 4,127,691. In accordance with that patent, selected segments of long discharge slots on the discharge face of a conventional die are plugged to pattern the discharge flow into a honeycomb body with a staggered or "flexible" rectangular cell cross-section. Although extruded products of this type exhibit greater inherent flexibility, due to the absence of webs running continuously across the cell array, dies with plugged or other elaborately patterned discharge slot configurations are both difficult to fabricate and expensive. In addition, difficulty can be encountered in designing a feedhole array sufficiently homogeneous in layout to assure uniform continuous batch extrusion characteristics in the die.

Accordingly, it is a principal object of the present invention to provide a novel and economical extrusion die, and method for using it to make honeycomb bodies, which can produce extruded green ceramic honeycomb preforms having a "flexible" cell configuration. It is a further object of the invention to provide an extrusion die design incorporating an arrangement of straight slots and feedholes such that the cross-sectional cell shape and cell arrangement of extruded bodies produced by the die do not comprise any long straight webs.

It is a further object of the invention to provide an extruded honeycomb body having a cross-sectional cell shape and cell arrangement substantially free of long straight web segments. It is a further object of the invention to provide an extruded honeycomb body having a cross-sectional cell shape and cell arrangement in the configuration of a plurality of nested rhombuses.

It is a further object of the invention to provide an improved method for making an extruded honeycomb body having a cross-sectional cell shape and cell arrangement in the configuration of a plurality of nested rhombuses.

Other objects of the invention will become apparent from the following description thereof.

SUMMARY OF THE INVENTION

The present invention is based in part on the discovery that, through proper positioning of feedholes in the feedhole portion of a die adapted for the extrusion of a conventional triangular cell honeycomb body, a honeycomb body which is of rhombic rather than triangular cell cross-section can be produced. Further, the rhombic cell array produced from the die of the invention is characterized by a unique arrangement of rhombic cells imparting greatly improved flexibility to the structure.

In a honeycomb body provided in accordance with the invention, each rhombic cell in the array of cells present in the honeycomb cross-section shares at least one of its acute vertex points with five other rhombic cells. Thus each cell is associated, at one or both of its acute vertices, with a group of six cells, clustered about and radiating from a common vertex point and sharing six cell walls.

The cell clustering of these honeycombs thus differs entirely from the cell pattern in conventional rhombic or slant-cell designs, wherein each vertex point on the rhombus is shared at most with only with three other cells, the cells being linearly aligned and stacked along straight axes. In the latter type of array, the rhombus cell configuration does not eliminate long straight webs from the honeycomb structure.

In a first aspect, then, the present invention includes an extrusion die for extruding a honeycomb body, the die incorporating a feedhole portion bounded by an inlet face and a discharge slot portion bounded by an outlet face. The discharge slot portion comprises multiple discharge slots open to the outlet face and the feedhole portion comprises multiple feedholes open at the inlet face and communicating with the discharge slots on the outlet face.

As in a conventional triangular cell extrusion die, these discharge slots are long straight slots traversing the entire slot pattern on the face of the die, and they criss-cross on the outlet face to form an array of interconnected triangles sharing vertices on slot intersections and sides on slot segments between intersections. The feedhole pattern for this discharge slot array differs, however, from the conventional pattern of one feedhole located at each slot intersection, separated from the next adjacent feedhole by a single slot segment only. Instead, the feedholes are located at slot intersection points spaced more widely from each other along the slots, such that each feedhole is separated from the next adjacent feedhole by three slot segments instead of one slot segment.

The effect of this feedhole arrangement is that, for each triangle in the discharge slot array, a single feedhole communicates with the intersection of two of the three segments and no feedholes communicate with the third segment, either at the endpoints or in the midsection thereof. Therefore, in the course of extrusion with this feedhole arrangement, extrudable material is discharged through the two slot segments communicating with the feedhole, but no material is discharged from the third slot segment of each triangle inasmuch as no feedhole communicates therewith. It is this selective feeding and slot discharge which produces a rhombic rather than a triangular cell pattern in the honeycombs of the invention.

In another aspect, therefore, the invention includes a method for manufacturing a honeycomb body of rhombic cell cross-section by an extrusion process. The honeycomb body is formed through the selective discharge of an extrudable material supplied by a plurality of feedholes through an array of criss-crossing intersecting discharge slots in an outlet face of a honeycomb extrusion die.

In the extrusion die employed, the discharge slots intersect to form slot segments which connect at slot intersections to form triangles. However, the feedholes communicate with the discharge slots on selected slot intersections only. Thus the feedholes are positioned such that, on each discharge slot, each feedhole is separated from the next adjacent feedhole by three slot segments or, equivalently, two slot intersections which do not communicate with any feedholes.

In carrying out the method, extrudable material is supplied by the feedholes to the selected slot intersections at a rate sufficient to fill slot segments intersecting at those intersections, but at a rate which is insufficient to fill slot segments not intersecting at those intersections. Thus slot segments positioned between slot intersections not supplied by feedholes are not filled.

As a consequence of this supply scheme, therefore, the extrudable material is discharged from the slot segments intersecting at those selected slot intersections communicating or connecting directly with a feedhole. On the other hand, no extrudable material is discharged from the isolated slot segments not intersecting at the selected slot intersections, since the latter segments do not communicate directly with any feedholes but rather are positioned between slot intersections where no feedholes have been provided.

The extrusion of honeycomb bodies of rhombic cell cross-section from an extrusion die of the kind described was entirely unexpected, since it had been anticipated that a triangular cell body of high cell density would have been produced from the triangular discharge slot pattern employed.

DESCRIPTION OF THE DRAWING

The invention may be further understood by reference to the drawings, wherein.

DETAILED DESCRIPTION

Figure 1:
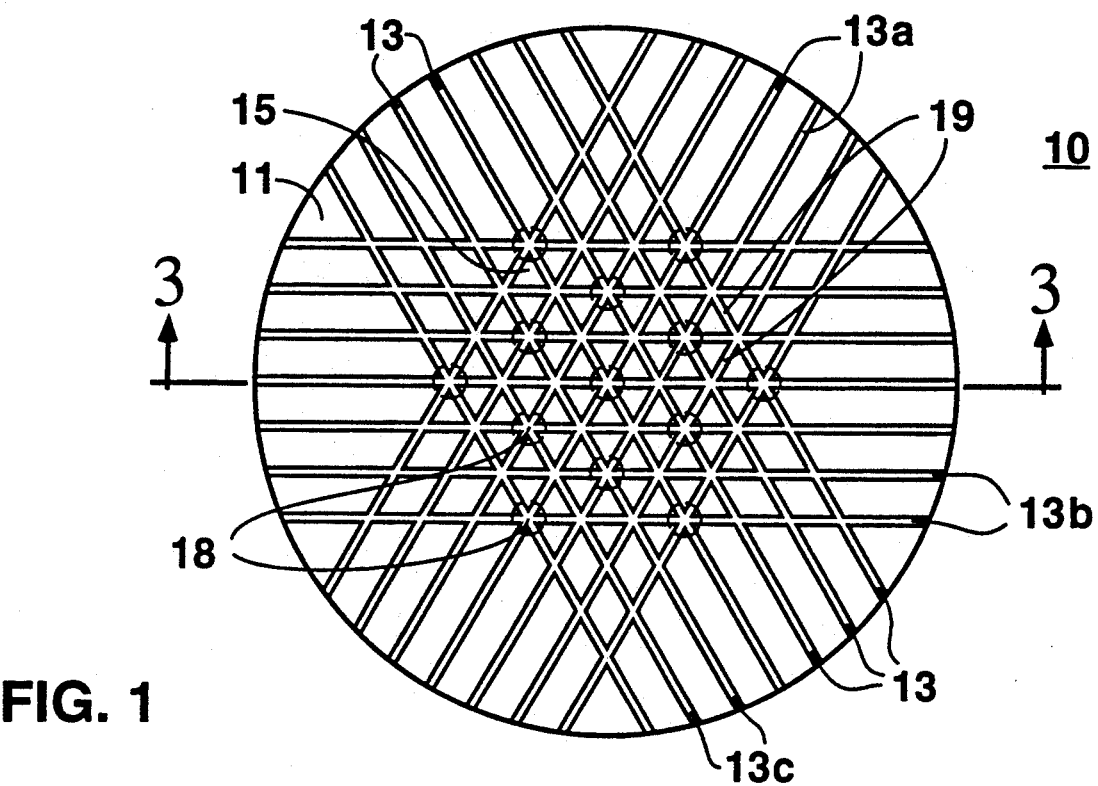
FIG. 1 is a schematic top plan view of the outlet or slotted face of a die according to the invention.

Dies provided in accordance with the invention may be fabricated of any of the known materials useful for such apparatus. Typically, such dies are formed of carbon steel, stainless steel alloys, or similar strong and tough metals. The particular material selected will of course depend upon the cell density and number of feed holes required, as well as on the rheology of the extrudable material to be extruded. Thus metals or even nonmetals of lesser strength and/or toughness may be useful for some applications.

As is conventional, these dies may be of one piece construction, including a slotted front portion integral with a communicating rear feedhole portion, or they may be fabricated of two or more plate or block components each forming a selected portion of the die. In the one-piece design, the die body incorporates a feed hole portion bounded by the die inlet face and a discharge slot portion bounded by the die outlet face, the discharge slot comprising a criss-cross array of long, generally straight discharge slots open to the outlet face.

The discharge slots extend into the die body toward the inlet face and intersect with each other to form a plurality of triangular pins, each pin with vertices at slot intersections and sides on slot segments. The feed hole portion comprises a plurality of feed holes extending into the die body toward the outlet face, with each feed hole being open to the inlet face and communicating or connecting with a slot intersection in the discharge slot portion.

As is conventional in extrusion dies for triangular cell honeycomb body extrusion, each feedhole located at a slot intersection is a shared feedhole. That is, each feedhole connects with and feeds extrudable material to a total of six slot segments (segments of three interconnecting long slots) which interconnect at the feedhole location. In the die of the invention, each of these feedholes is of a selected flow capacity such that extrudable material flow therethrough is sufficient to fill all slot segments communicating directly with that feedhole, but insufficient to overflow into or fill slot segments not connecting therewith.

As will hereinafter more fully appear, the effect of this feedhole distribution is to leave isolated slots unfilled and to produce an extruded green honeycomb body wherein only selected slots generate the web portions of the extruded rhombic cell shape.

The machining of feed holes and slots in dies of this design may be accomplished by conventional techniques, to be employed according to the particular material selected for constructing the die. As is well known, conventional drilling and slotting methods may be used for easily machineable metal die components of carbon steel, brass or other metals, while electrochemical machining techniques such as electrical discharge machining or the like may be preferred for hard steel alloys or other more brittle metallic or ceramic materials.

The dies and extrusion methods of the invention are useful for the extrusion of a variety of extrudable materials, but have principal application for the manufacture of inorganic honeycomb bodies from plastic batches of powdered metal, ceramic, or other inorganic materials at ambient or near-ambient extrusion temperatures. Thus, for example, extrusion batches formed of metal powders or powders of ceramic materials in combination with suitable binders and extrusion aides can be shaped into honeycomb green bodies using these dies. The resulting green bodies can then be processed by heating to cure or remove organic binders, typically at temperatures sufficient to sinter or otherwise consolidate the powders into durable integral honeycomb products.

Depending upon the particular materials to be extruded by the die, wear coatings or coatings to improve the lubricity of the feed hole and slot walls of these dies may be applied subsequent to the machining of the die. Examples of such coatings include electroless nickel plating layers and vapor-deposited carbide, nitride and/or boride coatings.

Figure 2:
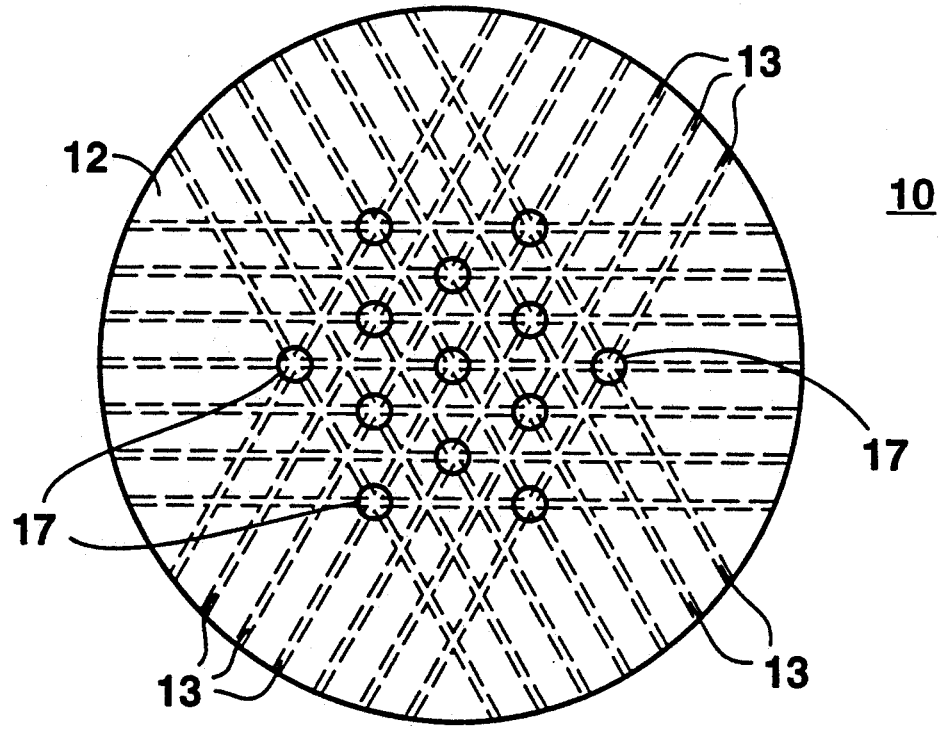
FIG. 2 is a schematic top plan view of the inlet or feedhole face of the die of FIG. 1.
Figure 3:
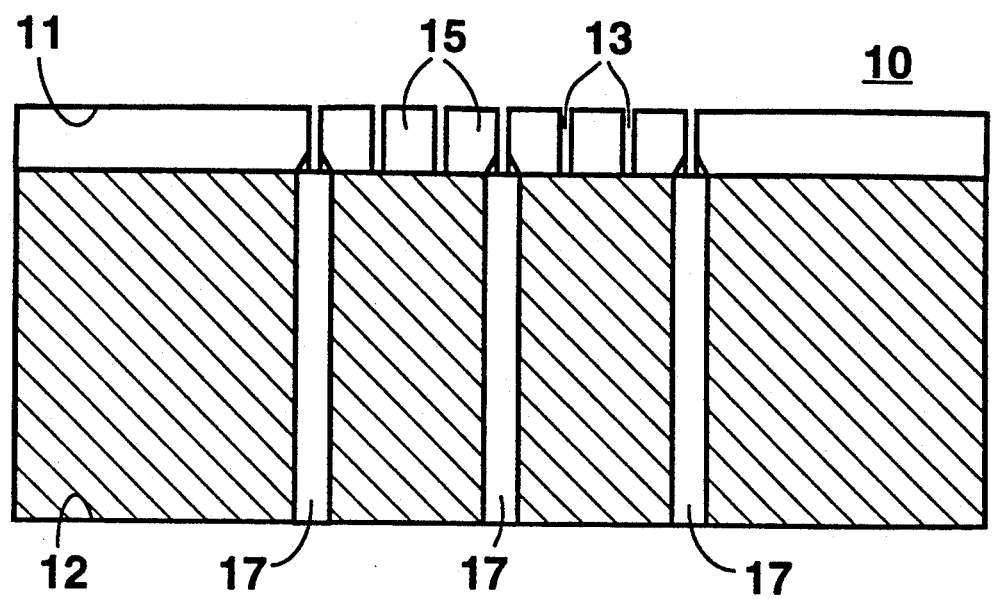
FIG. 3 is a schematic elevational view of the die of FIG. 1 shown along line 2—2 of FIG. 1.

An example of the structure of an extrusion die provided in accordance with the invention is provided in FIGS. 1-3 of the drawing, those Figures showing various views of a die 10 and wherein like reference numerals refer to the same features of the die in each of the three views. FIGS. 1 and 2 show, respectively, plan views of the top and bottom of die 10, the top view of FIG. 1 showing the slotted outlet face 11 and the bottom view of FIG. 2 showing the inlet face 12 of the die. FIG. 3 provides a schematic elevational view of die 10 as seen along line 3—3 of FIG. 1.

As shown in the various Figures, the outlet face 11 of the die is provided with a plurality of interconnected, crisscross discharge slots represented by slots 13, all slots extending inwardly from the outlet face 11. These form three parallel arrays of slots, each array being angularly offset from the other two arrays by 60°.

Pairs of discharge slots in each array (eg. slot pair 13a in FIG. 1), when crisscrossed by slot pairs from the other two angularly offset discharge slot arrays (eg., slot pairs 13b and 13c in FIG. 1), form a multiplicity of triangular core members or pins represented by pin 15 (and pins 15 in FIG. 3) which extend inwardly from the outlet face 11 of the die toward the inlet face 12.

Alternatively, the slots 13 can be viewed as being defined by the triangular configuration and arrayed positioning of the pins 15.

The slots 13 are in communication with and therefore fed with extrudable material by a plurality of feed holes, represented generally by feedholes 17 in FIG. 2. As shown in FIGS. 2 and 3, the feedholes are aligned with slot intersections, and extend somewhat into the bases of the slots. All of these holes originate at the inlet face 12 of the die, and each hole directly connects with and preferably overlaps the bottom ends of the slots 13, as best seen in FIG. 3.

While the slots 13 are all shown of equivalent width, the width of each of the slots or sets of slots may of course be varied to provide walls of differing thickness in an extruded body, as may be selected to accommodate the requirements of the particular application for which the extruded body is intended.

In the feedhole arrangement utilized to supply the slots in the die of the invention, each of the feedholes 17 are located at slot intersections, eg., intersections 18 in FIG. 1. Thus each feedhole supplies extrudable material to all slot segments connecting or communicating with that feedhole. More particularly, each feedhole in slot intersection positions such as 18 supplies extrudable material to all six slot segments radiating therefrom.

Critical to the operation of the invention is the fact that feedholes 17 are not positioned at every slot intersection, but only at selected slot intersections spaced sufficiently from one another to leave some slot segments isolated from the feedholes. Hence, as seen in FIG. 1, each of those slot segments positioned midway between feedholes on the same long slot, such as slot segments 19 in FIG. 1, are not in direct communication with any feedhole. As a consequence, those slot segments are not supplied with extrudable material in the course of extrusion through the die, and do not discharge any material for web formation during the extrusion process.

Figure 4:
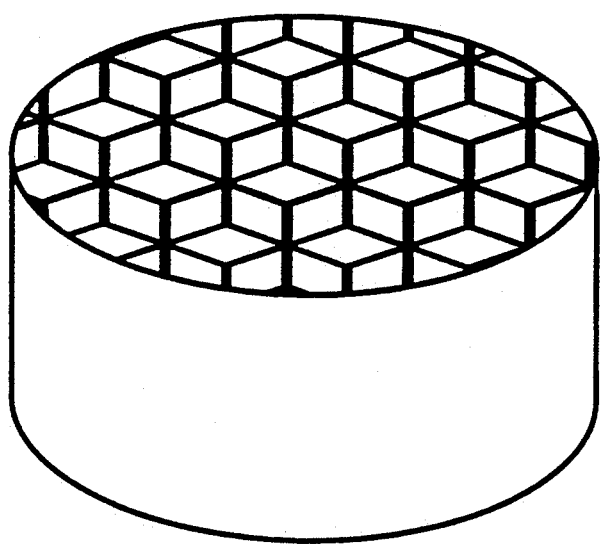
FIG. 4 is a perspective view of a honeycomb body made by extrusion in accordance with the invention.

The effect of the resulting selective discharge only from slot segments communicating directly with feedholes which occurs during the operation of the die is an extruded honeycomb having a clustered rhombic cell array rather than the expected triangular cell array. FIG. 4 of the drawing provides a schematic perspective view of such an extruded honeycomb body resulting from such selective discharge.

EXAMPLE

To fabricate an extrusion die having a design such as shown in FIGS. 1-3 of the drawing, a plate of carbon steel to serve as a die body, having a thickness of about 1.2 inches (30 mm), is first selected. This steel is suitably formed of Freemax 15 carbon steel, an easily machineable steel which is commercially available from the Buell Specialty Steel Co. of Rochester, N.Y., USA.

Into one face of the steel plate, ie., the face which is selected to serve as the discharge or outlet face of the die, three arrays or sets of parallel discharge slots are machined. These slots are machined by sawing, and have a width of about 0.010 inches (0.25 mm), a slot spacing of about 0.09306 inches (2.36 mm), and a depth of about 0.105 inches (2.67 mm).

To provide supply means for the discharge slots thus created, multiple feedholes are provided in the face of the plate opposite the slotted face (the inlet face). These are formed by gun-drilling the plate to produce multiple feedholes about 0.054 inches (1.37 mm) in diameter and 1.1 inches (27.94 mm) in depth. This depth is sufficient to insure that the feedholes will overlap and extend into the slotted region on the discharge face of the die.

The feedholes thus provided are spaced and positioned to intersect only selected slot intersections. The feedhole pattern used is a pattern such as illustrated in FIGS. 1 and 2 of the drawing, wherein each feedhole is separated by three slot segments (two slot intersections) from the next adjacent feedhole on the same long slot. Thus, in this arrangement, the six slot segments about each feedhole communicate or connect directly with that feedhole, and the remaining slot segments are not accessed by any feedhole. Feedholes of the diameter provided are of sufficient size to supply the six connecting slot segments of the widths employed, but are not sufficient in capacity to fill the unconnected slot segments.

The die provided as described exhibits excellent extrusion characteristics and well-controlled rhombic cell formation for the extrusion of ceramic batches comprising mineral batch ingredients with appropriate vehicle components and extrusion aides. A suitable batch composition for this purpose is an extrusion batch composition made up of about 40% talc (−200 mesh), 15% kaolin clay (−150 mesh), 31% calcined kaolin clay (−150 mesh) and 14% alumina (−170 mesh) by weight, and further including a vehicle comprised of about 32 parts water, 3 parts Methocel TM methyl cellulose binder, and 0.75 parts lubricant by weight for each 100 parts of the talc-clay-alumina mixture.

This extrusion batch may be uniformly extruded through the die at extrusion pressures on the order of 1600 psi. The product is a green honeycomb body substantially free of distortion and having a rhombic cell cross-section as illustrated in FIG. 4 of the drawing.

This green honeycomb can then be dried and sintered to provide a thin-walled ceramic honeycomb of the desired clustered rhombus design offering excellent structural integrity, cell shape homogeneity, and thermal shock performance.

Although the invention has been particularly described above with respect to specific examples of materials, apparatus and/or procedures, it will be recognized that these examples are presented for purposes of illustration only and are not intended to be limiting. Thus numerous modifications and variations upon the materials, processes and apparatus specifically described herein may be resorted to by those skilled in the art within the scope of the appended claims.

I claim:

1. An extrusion die for extruding a honeycomb body, the die incorporating a feedhole portion bounded by an inlet face and a discharge slot portion bounded by an outlet face, the discharge slot portion comprising multiple long discharge slots and the feedhole portion comprising multiple feedholes open at the inlet face which extend toward and communicate with the discharge slots, wherein:

the discharge slots criss-cross on the outlet face to form an array of interconnected triangles, the triangles having shared vertices on slot intersections and shared sides on slot segments between slot intersections;

the feedholes communicate only with slot intersections; and the feedholes are alternately positioned such that each feedhole is separated by three slot segments from the next adjacent feedhole on the same slot.

2. An extrusion die formed of a die body incorporating a feed hole portion bounded by an inlet face and a discharge slot portion bounded by an outlet face;

the discharge slot portion comprising a criss-cross array of long discharge slots open to the outlet face, the slots extending into the die body toward the inlet face and intersecting with each other to form a plurality of slot segments, the slot segments connecting to form triangular pins, each pin with vertices at slot intersections and sides on slot segments;

the feed hole portion comprising a plurality of feed holes extending into the die body toward the outlet face for supplying extrudable material thereto, each feed hole being open to the inlet face and communicating with a slot intersection in the discharge slot portion, wherein:

for each long slot in the array, the feedholes communicating with the slot are positioned only at each third intersection of the slot with other slots in the array.

3. An extrusion die in accordance with claim 2 which is fabricated of a metal.

4. An extrusion die in accordance with claim 3 which is formed of a metal selected from the group consisting of carbon steel and steel alloys.

5. An extrusion die in accordance with claim 4 which is of one-piece construction.

6. An extrusion die in accordance with claim 5 which incorporates a wear coating selected from the group consisting of nickel, metal carbide, metal nitride and metal carbo-nitride.

7. A method for manufacturing a honeycomb body of rhombic cell cross-section through the discharge of an extrudable material supplied by a plurality of feedholes through an array of criss-crossing intersecting discharge slots in an outlet face of a honeycomb extrusion die, wherein the discharge slots intersect to form slot segments which connect at slot intersections to form triangles;

the feedholes communicate with the discharge slots on selected slot intersections only, the feedholes being positioned such that, on each discharge slot, each feedhole is separated from the next adjacent feedhole by three slot segments; and extrudable material is supplied by the feedholes at a rate sufficient to fill slot segments intersecting at the selected slot intersections but at a rate insufficient to fill slot segments not intersecting at the selected slot intersections.

8. A method in accordance with claim 7 wherein extrudable material is discharged from slot segments intersecting at the selected slot intersections, and wherein no extrudable material is discharged from slot segments not intersecting at the selected slot intersections.

9. A method in accordance with claim 8 wherein the extrudable material comprises a powdered metal or a powder of a ceramic material.

10. A method in accordance with claim 8 wherein the extrudable material is a ceramic batch material comprising at least one powdered ceramic material and a vehicle for the powdered ceramic material.

* * * * *